Figure 1:
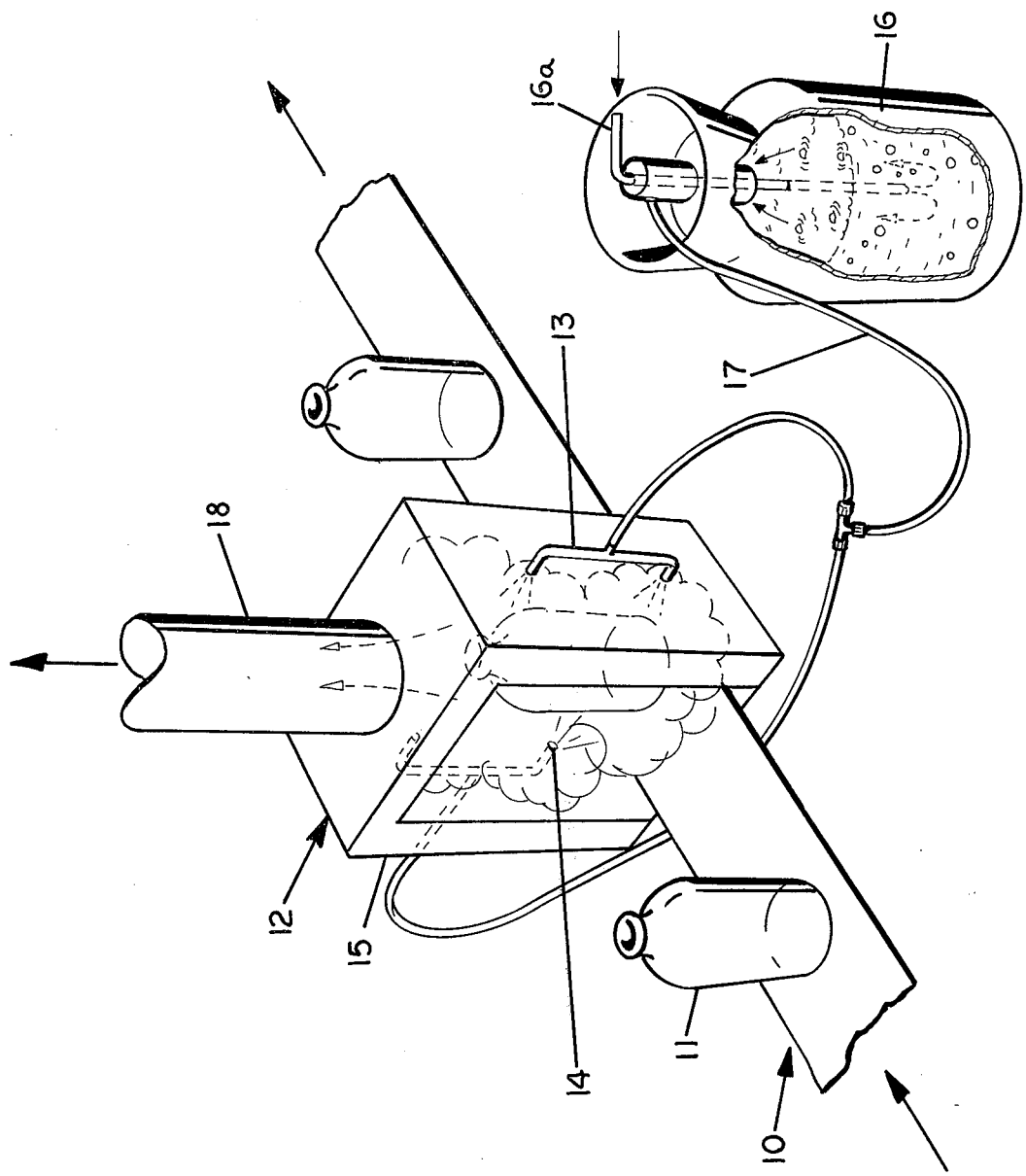

United States Patent [19]

Russell

[11] 3,956,532

[45] May 11, 1976

[54] RECOVERY OF METAL HALIDES

[75] Inventor: Richard H. Russell, Adrian, Mich.

[73] Assignee: Owens-Illinois, Inc., Toledo, Ohio

[22] Filed: Nov. 29, 1974

[21] Appl. No.: 528,503

[52] U.S. Cl. ............................ 427/226; 55/71;
65/60 C; 423/237; 423/240; 427/255;
427/314; 427/331; 427/345
[51] Int. Cl.² ................. C01C 1/16; C03C 17/22
[58] Field of Search ............ 117/211, 102 A, 124 T,
117/124 B; 427/109, 166, 345, 255, 331,
226, 314; 55/70, 71; 423/240, 237; 65/60

[56] References Cited
UNITED STATES PATENTS

| | | | |
|---|---|---|---|
| 2,167,358 | 7/1939 | Gleason | 423/240 X |
| 3,690,041 | 9/1972 | Low | 55/71 |
| 3,789,109 | 1/1974 | Lyon et al. | 55/71 X |

*Primary Examiner*—Ralph S. Kendall
*Attorney, Agent, or Firm*—Howard G. Bruss, Jr.; E. J. Holler

[57] ABSTRACT

Disclosed is a method for recovering vaporous metal halides, such as tin chloride, from a gaseous stream by introducing volatile amines, such as ammonia, into the stream to form a solid reaction product which is separated and recovered for reuse.

12 Claims, 2 Drawing Figures

RECOVERY OF METAL HALIDES

It is well-known that glass in its pristine condition is a very strong material. Unfortunately, scratches and abrasions on the glass surface considerably decreases its strength. Consequently, glass containers such as jars, bottles, tumblers, and the like have their maximum strength as soon as they are formed and this strength diminishes as the containers come in contact with each other and with other surfaces as occurs during inspection, handling, packaging, shipping, and consumer use of glassware.

To overcome this problem, there has been a great deal of research in the glass industry towards development of coatings which preserve the glass strength and allow the glass containers to be handled, filled, and used by the consumer.

In many of these coating processes the glass container is coated by pyrolyzing thereon volatile metal halides such as chlorides of tin or titanium at the hot end of the forming process where the temperature is often in the range of 900° to 1100°F and then overcoating with a protective organic coating at the cold end of the lehr. It is believed that this pyrolysis reaction forms the corresponding metal oxide, although other metal compounds can be formed on the glass surface. Such hot end coatings are illustrated in U.S. Pat. Nos. 3,323,889; 3,425,859; 3,598,632; 3,554,787; 3,498,825; 3,418,154; 3,420,693; 3,445,269; 3,407,085; 3,414,429; 3,352,707; 3,819,346; RE 28,076; 3,819,404; 3,827,870; 3,498,819; 2,375,482; 3,684,469; and 3,561,940. The above types of coatings are "production line" coatings because their application is accomplished as part of the forming and annealing sequence.

While these hot end pyrolysis reactions provide a beneficial coating, they also create undesirable pollution problems in the overall glass container manufacturing operation. When coating with stannic chloride vapor, a substantial percent of the $SnCl_4$ (probably more than 90%) does not pyrolyze on the glassware, but passes through the coating chamber and is subsequently carried away in the exhaust stream. This is undesirable from both an economic and environmental standpoint. In addition, hydrogen chloride gas (HCl gas) is a reaction product of the pyrolysis which is removed in the exhaust stream. Thus, exhaust gas from the coating chamber cannot simply be emitted into the atmosphere surrounding the glass container manufacturing facility because of the large amount of $SnCl_4$ vapor and the HCl gas entrained therein, the latter of which reacts with water vapor or droplets to form hydrochloric acid.

The present invention overcomes these problems by providing an efficient, economical and environmentally attractive process for removing and recovering vaporous metal halides from the gaseous effluent stream from the hot end glassware coating process.

Many processes have been used in the past to deal with this problem. Most of these processes concern some type of wet scrubbing system where the gaseous effluent stream is contacted with an alkaline liquid to form a chemical sludge which is further processed for recovery. Processes of this general type are shown in U.S. Pat. No. 3,789,109 and the article entitled "Pollution Control at Lower Cost" by D. V. Gordon, *The Glass Industry*, Feburary, 1974.

The present invention represents a departure from these prior art processes by providing a vapor phase reaction process which results in the direct formation of an easily recoverable solid product and thereby obviates the need for liquid reactants and reaction products and the inherent disadvantages in handling and recovering.

In attaining the objects of this invention, one feature resides in
admixing ammonia or other volatile amine with a gas stream containing vaporous metal halides to form a gaseous reaction mixture;
maintaining said gaseous reaction mixture at a temperature and for a time sufficient to form a solid reaction product; and
separating said solid reaction product from the gaseous reaction mixture.

The term metal halide as used herein includes metal compounds (including silicon) having an empirical formula including one or more halides. The presence of other components such as oxygen or organic radicals in the empirical formula in addition to the halide has not been found to be detrimental to performance. In a particularly significant commercial embodiment of the present invention, the gaseous stream containing the vaporous metal halides is the effluent from a glassware coating process wherein a tin halide is being pyrolyzed on the hot glass surface. In commercial practice the tin halide is stannic chloride although vaporous stannic iodide, stannic bromide, $SnBr_3Cl$, $SnBrCl_3$, $SnCl_2I_2$, vaporous dibutyl tin dichloride, dimethyl tin dichloride, and stannous chloride can also be recovered in accordance with the inventive principles. Other organo substituted tin halides include diisopropyl tin dibromide, trimethyl tin chloride, tripropyl tin chloride, triphenyl tin chloride, dimethyl tin dichloride as in U.S. Pat. Nos. 3,647,531; 3,420,693; 3,352,707; 3,705,054; or a published Japanese patent application No. 69/18,747; dilauryl tin dichloride, dibutyl tin dichloride, diphenyl tin dichloride as in U.S. Pat. No. 2,567,331; and tribenzyl tin chloride, tributyl tin chloride, tolyl tin trichloride, ethyl tin tribromide as in U.S. Pat. No. 2,614,944. The process is also applicable to the recovery of other vaporous metal halides including vanadium halides and oxyhalides (e.g. vanadium oxychloride, vanadium tetrachloride, vanadium pentoxychloride), substituted and unsubstituted halosilanes (e.g. tetrachlorosilane, methyl trichlorosilane) aluminum chloride and titanium halides such as titanium tetrachloride.

As used herein the term "amine" refers to compounds containing a substituted or unsubstituted amino group and is inclusive of ammonia, methyl amine, trimethyl amines, dimethyl amines, ethyl amines, propyl amines, butyl amines, and pentyl amines. From these, ammonia is preferred because it is readily volatile for efficient reaction, readily available, and relatively inexpensive.

The time and temperature of reaction between the gaseous amine and the metal halide vapor is not particularly critical as long as the combined effect is sufficient to allow complete reaction therebetween. In the reaction between vaporous stannic chloride and ammonia, the reaction takes place in less than about 15 minutes with a residence time period in the neighborhood of about 1/10 second to about 1 minute being sufficient for most applications.

The temperature of reaction is usually a function of the temperature of the exhaust gas stream. The exhaust gas from pyrolyzing stannic chloride on glass containers usually varies from about 70°F to about 350°F with about 90°F to 250°F being typical for most glassware treating facilities.

The molar proportions of amine to metal halide depends upon the reaction product formed and is easily determined for any application by using sufficient amine to cause the gaseous phase of the reaction mixture to be at least neutral and preferably basic to moist pH paper. These test results indicate a stoichiometric proportion or an excess of ammonia or other amine respectively. It is not usually desirable to use a great excess of amine because this is wasteful and could cause an "amine pollution" problem. The tests reported in the Examples that follow indicate that when the gaseous phase has a pH of 10–11 satisfactory results are obtained.

In the reaction between stannic chloride and ammonia, the reaction product is a white, dry, particulate solid. This test is usually conducted after the solids have been removed from the reaction mixture. The term "neutral" and "basic" are used in their conventional sense and refer to a pH of about 7, and a pH above 7, respectively. The term "acid", when used, refers to a pH of less than 7.

The reaction product formed by the present process can be separated from the gaseous reaction mixture by conventional filtration techniques. "Filtration" here is intended to include filters, cyclone separators, and electrostatic precipitators; in other words any separation of a dispersed solid from a gas which separation involves removal of the solid as such. A preferred form of filter is the conventional bag filter (bag collector). Felt filters or cloth filters can be used with or without a precoat.

It is recognized that gas recovery processes using ammonia as a precipitant have been disclosed in the past such as in U.S. Pat. No. 1,292,016 disclosing the process for recovering vaporous bromine from a gas by treating the gas with ammonia to produce a fume of ammonium bromide which is electrostatically precipitated; U.S. Pat. No. 3,322,659 and Canadian Pat. No. 776,088 disclosing a process for recovering fluorine compounds from the waste gas from an aluminum reduction cell be treating the gas with gaseous ammonia to form a solid reaction product which is filtered from the gas stream, or U.S. Pat. No. 1,907,975 disclosing a method for recovering iodine from a charcoal by treating the charcoal with ammonia gas to form ammonium iodide which is separated for recovery. However, none of these prior art processes suggest the specific advantages achieved in the recovery of vaporous metal halides with amines by the present invention.

The Examples that follow clearly indicate the principles of the present invention are applicable to the recovery of vaporous metal halides other than the effluent gas from the pyrolysis of metal halides on hot glassware.

Figure 2:
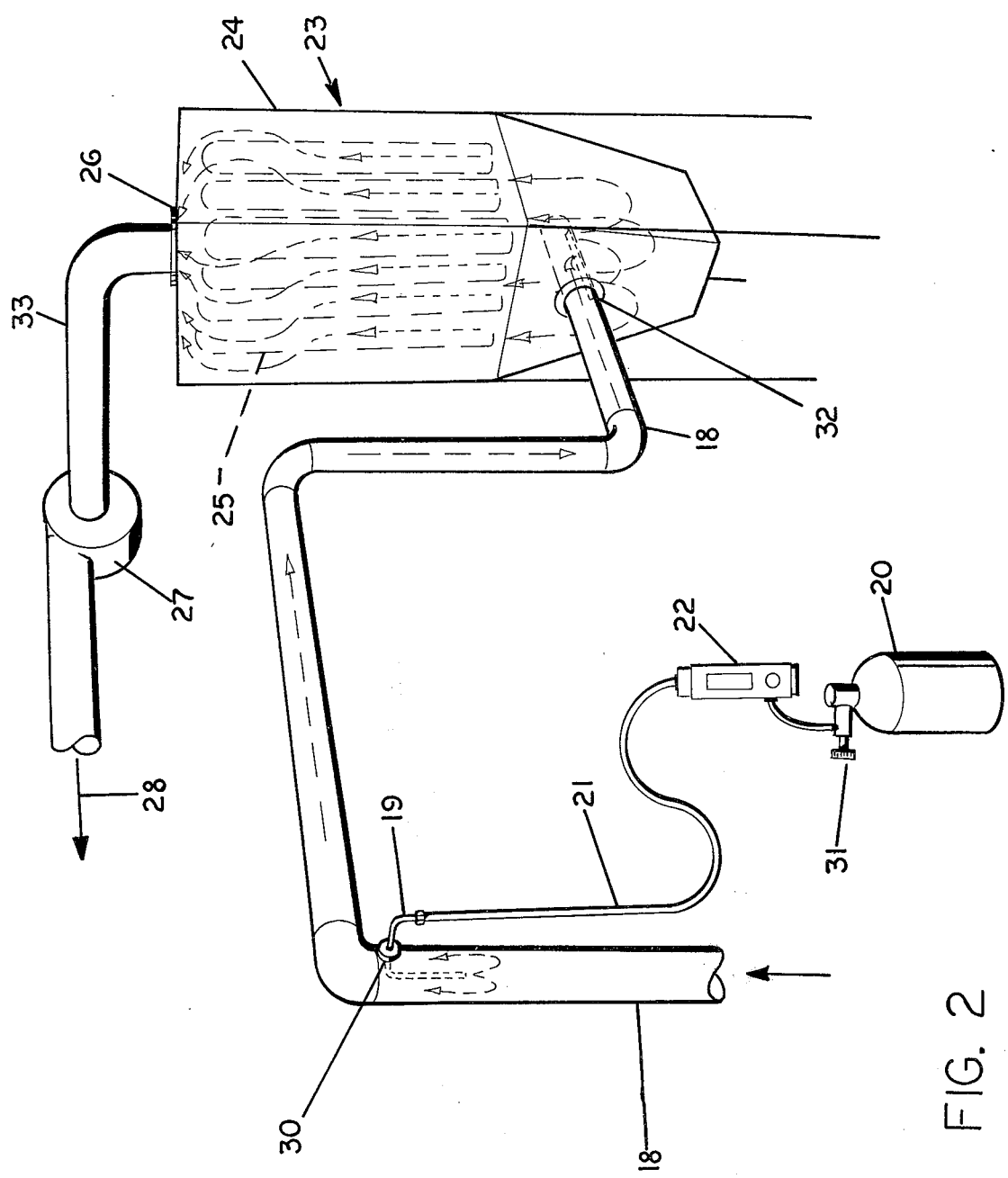

The principles of the present invention are further described with reference to the drawings wherein FIG. 1 is a perspective view of apparatus for coating glassware with tin halide vapor and FIG. 2 is a perspective view of apparatus for recovering the excess tin halide vapor generated by the coating operation of FIG. 1.

In FIG. 1, reference numeral 10 indicates a conveyor belt generally known in the art as a "flight conveyor" which conveys the freshly formed glass bottles from the forming machine to the annealing lehr. Positioned on conveyor 10 are several freshly formed glass beer bottles 11 which are being transferred from forming machine to an annealing lehr which are conventional and are not shown. Positioned over conveyor 10 is vapor treating chamber 12 which surrounds conveyor 10 so that the freshly formed glass bottles 11 must pass therethrough. Ambient air can also enter chamber 12 where the glass bottles are being treated. Chamber 12 comprises a generally tunnel-shaped metal structure having sidewalls 15 equipped with inlet ports 13 and 14 for introduction and distribution of vaporous stannic chloride.

The stannic chloride vapor is supplied to inlet ports 13 and 14 from a commercially available cylinder 16 of liquid stannic chloride by means of tubing 17. Cylinder 16 is also equipped with a bubbler tube 16a. The stannic chloride is vaporized by bubbling a dry, inert gas such as air or nitrogen through the liquid stannic chloride and then directing the resulting gas stream through tubing 17 into inlet ports 13 and 14. The design of the chamber 12 forms no part of the present invention and other types of chambers such as shown in U.S. Pat. Nos. RE 28,076; 3,819,404; 3,827,870; 3,498,819; 2,375,482; and 3,561,940 can also be used.

An exhaust duct 18 is positioned at the top of chamber 12 for receiving the exhaust gases from the pyrolysis of the stannic chloride on the hot glassware. For conventional bottle treating processes, corrosion resistant metal, plastic, or fiberglass ductwork having a nominal diameter of about 3 to 8 inches is quite satisfactory.

Referring now to FIG. 2 exhaust duct 18 has positioned therein an ammonia distribution pipe 19. Pipe 19 passes into duct 18 through seal 30 and extends axially in duct 18 against the direction of exhaust gas flow as indicated by the dotted arrow. A conventional ammonia cylinder 20 equipped with a flow control value 31 is connected to distribution pipe 19 through tubing 21 and rotometer 22. Other types of nozzles and gas mixing devices can be used in place of pipe 19.

Downstream of the pipe 19, duct 18 discharges into a filtration device in the form of a bag collector 23 of conventional design. Bag collector 23 comprises a rigid housing 24 equipped with an inlet 32 and an outlet 26. In the flow path between inlet 32 and outlet 26 are positioned a series of conventional cloth filtration bags 25 so the gas entering the bag collector from duct 18 must flow through bags 25. Thus any solids which are present in the exhaust gas are filtered in the bags 25. Bag collector 23 is also equipped with access ports (not shown) for cleaning and replacing bags 25 when solids accumulate and filtration efficiency decreases. For conventional glass container treating processes cotton or synthetic fabric bags having a filtration area of about 50 to 500 square feet per coating chamber 12 are quite satisfactory.

Outlet 26 is connected to duct 33 which in turn is connected to the suction of blower 27 so that the gas flow through the system is in the direction indicated by the dotted arrows. Blower 27 discharges the purified exhaust gas stream 28.

EXAMPLE 1

In operation involving the apparatus just described, stannic chloride vapor flows into chamber 12 from cylinder 16. Freshly formed beer bottles having a temperature of about 900°F to 1,000°F are conveyed through chamber 12 and a tin oxide coating is pyrolyzed thereon.

Exhaust gas leaving the chamber 12 through duct 18 is mostly air with about 2% water vapor, but contains the equivalent of about ¾ gram-mols per hour of $SnCl_4$ vapor. The exhaust gas flow rate is about 200 standard cubic feet per minute and the temperature is about 100°F. The exhaust gas tests acid (i.e. a pH of < 3) to moist pH paper.

Ammonia gas is introduced through distribution pipe 19 in the proportion sufficient to provide a concentration of about 300 parts (by volume) per million (parts by volume) of $NH_3$ in the exhaust gas. This concentration is the equivalent of 4.5 gram-mols of $NH_3$ per ¾ gram-mol of $SnCl_4$ present in the exhaust gas. The ammonia gas mixes immediately and reacts with the exhaust gas in duct 18 to form a dry, white, particulate reaction product which is recovered using conventional cloth fabric bags having a filtration area of 100 square feet in the bag collector 23. The residence time for the reaction to take place in duct 18 before reaching bag collector 23 is about ½ to 1 second. The purified exhaust gas stream 28 is essentially free from $SnCl_4$ and HCl (i.e. a chemical analysis does not detect the presence of either component) has a temperature of about 90°F, is basic to moist pH paper, (the pH is in excess of 10) and has a concentration of ammonia of about 100 ppm by volume (i.e. the equivalent of 1.5 gram-mol/hour of $NH_3$).

This test indicates that approximately 4 mols of gaseous $NH_3$ are required to completely react with and precipitate 1 mol of $SnCl_4$ vapor from the exhaust gas.

The foregoing procedures are repeated except that the exhaust gas leaving chamber 12 through duct 18 has a temperature of about 200–250°F and about 1% water vapor. Similar results are obtained and the fine white powdered product recovered is believed to be hydrated stannic oxide or ammonobasic tin chloride plus ammonium chloride.

Tin halide vapors generated by vaporizing dimethyl tin dichloride according to Japanese Patent application No. 69/18,747 can be recovered by reaction with gaseous ammonia with similar results according to the above procedure.

Similar results can also be obtained when the reaction product is precipitated and recovered using an electrostatic precipitator of conventional design such as in U.S. Pat. No. 1,292,016 or Section 16 of the 3rd Edition of Chemical Engineers' Handbook, edited by J. H. Perry, McGraw Hill Book Company, New York (1950) in place of the bag collector in the foregoing procedure.

EXAMPLE 2

To further demonstrate the principles of the present invention, the following series of tests are conducted using a synthetic exhaust gas formed by bubbling dry air (i.e. air dried by passing through silica gel) through a reservoir of liquid stannic chloride and mixing the resulting stannic chloride vapor with various proportions of gaseous ammonia in a transparent glass reaction chamber, and recovering the reaction product by filtration on a fabric filter. In this procedure, the flow rate of dry air and the flow rate of ammonia are measured using calibrated rotometers. From these measurements, the molar ratio of ammonia to stannic chloride in the reaction mixture is known with a reasonable degree of certainty based on a consideration of the vapor pressure and volatilization rate of $SnCl_4$. The temperatures of all reactants is room temperature (e.g. about 70°F) and the tests are run until equilibrium conditions are established. This requires less than a minute. The effluent gas leaving the filter is tested with moist pH paper. When the exhaust gas tests basic due to the excess $NH_3$, it is concluded that essentially all of the $SnCl_4$ has been removed because there is no visible cloud of hydrolysis product when the exhaust gas contacts moisture in the ambient air.

TEST A

The mol ratio of $NH_3$ to $SnCl_4$ is 0.6 to 1. The reaction product is a very light fume or "smoke". Very little solid product is collected on the filter and the pH of the effluent gas from the filter is acid to moist pH paper and the residual $SnCl_4$ therein readily hydrolyzes with the moisture in the ambient air to yield a white cloud.

TEST B

In this test the mol ratio of $NH_3$ to $SnCl_4$ is 1 to 1. The reaction product is a light smoke or fume which is slightly more dense than the fume of Test A. Very little reaction product collects on the filter. The effluent gas from the filter is acid to moist pH paper and the residual $SnCl_4$ therein readily hydrolyzes with the moisture in the ambient air to yield a white cloud.

TEST C

In this test the mol ratio of $NH_3$ to $SnCl_4$ is about 2.2 to 1. The reaction product is a dense white cloud and the reaction product is readily recovered as a solid product on the filter. The effluent gas from the filter is acid to moist pH paper but there is no readily visible cloud of hydrolysis product formed upon contact with the moisture in the ambient air indicating the presence of little or no $SnCl_4$.

TEST D

In this test the mol ratio of $NH_3$ to $SnCl_4$ is about 3.3 to 1. The reaction product is a very dense, white fume containing visible white particulates which are easily recovered on the filter. The effluent gas from the filter is basic to moist pH paper and there is no readily visible cloud of hydrolysis product formed upon contact with the moisture in the ambient air indicating the presence of little or no $SnCl_4$.

TEST E

In this test the mol ratio of $NH_3$ to $SnCl_4$ is about 9 to 1. The reaction product and results are the same as for Test D.

From the foregoing tests, no definite conclusion on the stoichiometric proportion of $NH_3$ to $SnCl_4$ can be drawn. The data does demonstrate, however, that when the effluent gas is rendered neutral or basic, essentially all of the $SnCl_4$ has been removed. Reactions of this type are known in the literature by Mellor, "A Comprehensive Treatise on Inorganic and Theoretical Chemistry", Longmans, Green and Company, London, Vol. VII, 1927, p. 445; E. Bannister and G. W. A. Fowles, J. Chem. Soc., 751 (1958); and E. Bannister and G. W. A. Fowles, J. Chem. Soc., 310 (1959).

EXAMPLE 3

To further demonstrate the principles of the present invention a synthetic exhaust gas, formed by bubbling dry air through a reservoir of liquid titanium tetrachloride, is mixed with gaseous ammonia in a transparent glass reaction chamber equipped with a filter using equipment and procedures similar to those used in Example 2. A yellowish-white fluffy powder reaction product forms. The effluent gas from the filter is acid to moist pH paper at first. The proportion of ammonia with respect to $TiCl_4$ vapor is then gradually increased until the effluent gas from the reaction chamber is basic to moist pH paper (the pH is in excess of 10). The effluent gas from the reaction chamber under these conditions appears to be essentially free of vaporous titanium tetrachloride because there is no visible cloud of hydrolysis product upon contact with the moisture in the ambient air.

EXAMPLE 4

To further demonstrate the principles of the present invention a synthetic exhaust gas, formed by bubbling dry air through a reservoir of liquid tin tetrachloride is mixed with gaseous dimethyl amine in a transparent glass reaction chamber equipped with a filter using equipment and procedures similar to those used in Example 2. A solid, white particulate reaction product forms. The effluent gas from the filter is acid to moist pH paper at first. The proportion of dimethyl amine with respect to $SnCl_4$ vapor is then gradually increased until the effluent gas from the reaction chamber is basic to moist pH paper. The effluent gas from the reaction chamber under these conditions appears to be essentially free from vaporous tin tetrachloride because there is no visible cloud of hydrolysis product upon contact with the moisture in the ambient air.

EXAMPLE 5

The procedures of Example 4 are repeated except that vanadium oxytrichloride ($VOCl_3$) is used in place of the tin tetrachloride. Results similar to those of Example 4 are obtained except that the solid reaction-product is a pale-yellow powder.

EXAMPLE 6

The procedures of Example 4 are repeated except that methyl trichlorosilane [$(CH_3) SiCl_3$] is used in place of the stannic chloride. Results similar to those of Example 4 are obtained.

EXAMPLE 7

A synthetic exhaust gas, (formed by vaporizing liquid butyl tin trichloride (obtained from M&T Chemicals Inc., Rahway, New Jersey) by mixing a stream of liquid butyl tin trichloride with a stream of dry air which had been preheated to about 200–250°F) is mixed with gaseous ammonia in a transparent glass reaction chamber equipped with a filter using equipment and procedures similar to those used in Example 2. The pH of the effluent gas from the reaction chamber is adjusted to about 10 by varying the proportion of gaseous ammonia. No butyl tin trichloride vapor is observed in the effluent gas from the chamber and the solid reaction product recovered under these conditions is fine white powder.

For convenience in disclosure, all of the patents and publications mentioned herein are incorporated by reference.

Having thus described the invention, what is claimed is:

1. In the process for scrubbing the effluent stream formed by pyrolyzing a metal halide selected from titanium halides or tin halides on a hot glass surface, said stream comprising moist air containing residual vaporous metal halide and the gaseous pyrolysis products of said metal halide, the improvement comprising:
   admixing an amine with said stream to form a gaseous reaction mixture;
   maintaining said gaseous reaction mixture at a temperature and for a time sufficient to form a solid reaction product;
   separating said solid reaction product from said reaction mixture.

2. The process of claim 1 wherein the proportion of amine is sufficient to neutralize the gaseous phase of said reaction mixture.

3. The process of claim 1 wherein the proportion of amine is sufficient to render the gaseous phase of said reaction mixture basic.

4. The process of claim 1 wherein said gaseous stream is the effluent formed by pyrolyzing tin halide on a hot glass surface.

5. The process of claim 4 wherein said tin halide is $SnCl_4$.

6. The process of claim 1 wherein said gaseous stream is the effluent formed by pyrolyzing titanium halide on a hot glass surface.

7. The process of claim 1 wherein said amine is ammonia.

8. The process of claim 1 wherein said temperature is in the range of about 70°F to about 350°F.

9. The process of claim 8 wherein said time is less than about one minute.

10. The process of claim 1 wherein said solid reaction product is separated from said reaction mixture by filtration.

11. In the process for removing vaporous $SnCl_4$ from the gaseous effluent resulting from the pyrolysis of $SnCl_4$ on a hot glass surface, the improvement which comprises;
   admixing ammonia with said effluent in the proportion sufficient to render the gaseous phase of the resulting reaction mixture basic and form a solid particulate, reaction product, and
   separating said solid reaction product from said reaction mixture.

12. The process of claim 11 wherein said solid reaction product is separated from said reaction mixture by filtration.

* * * * *